(12) United States Patent
Wang

(10) Patent No.: US 11,868,185 B2
(45) Date of Patent: Jan. 9, 2024

(54) SUPPORT ASSEMBLY AND DISPLAY DEVICE

(71) Applicant: BOE TECHNOLOGY GROUP CO., LTD., Beijing (CN)

(72) Inventor: Xinyu Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 291 days.

(21) Appl. No.: 17/606,222

(22) PCT Filed: Jan. 20, 2021

(86) PCT No.: PCT/CN2021/072936
§ 371 (c)(1),
(2) Date: Oct. 25, 2021

(87) PCT Pub. No.: WO2022/155819
PCT Pub. Date: Jul. 28, 2022

(65) Prior Publication Data
US 2023/0132879 A1    May 4, 2023

(51) Int. Cl.
*G06F 1/16* (2006.01)

(52) U.S. Cl.
CPC .......... *G06F 1/1656* (2013.01); *G06F 1/1652* (2013.01)

(58) Field of Classification Search
CPC .................................................. G06F 1/1652
See application file for complete search history.

(56) References Cited

U.S. PATENT DOCUMENTS

| 10,019,036 B2 * | 7/2018 | Sun | G06F 1/1652 |
| 10,175,792 B2 * | 1/2019 | Kim | G06F 1/1652 |
| 10,503,210 B2 * | 12/2019 | Lee | G06F 1/1681 |
| 10,783,809 B2 * | 9/2020 | Kim | G06F 1/1652 |
| 10,856,426 B2 * | 12/2020 | Jeon | H05K 5/0217 |

(Continued)

FOREIGN PATENT DOCUMENTS

| CN | 104714699 A | 6/2015 |
| CN | 208221344 U | 12/2018 |

(Continued)

OTHER PUBLICATIONS

Written Opinion for PCT Patent Application No. PCT/CN2021/072936 dated Feb. 15, 2022.

*Primary Examiner* — Lisa Lea-Edmonds
(74) *Attorney, Agent, or Firm* — Perilla Knox & Hildebrandt LLP; Kenneth A. Knox

(57) ABSTRACT

A support assembly and a display device are described, the support assembly supporting a flexible display panel. The support assembly includes a plurality of first support members and a plurality of second support members which are alternately arranged in a first direction. A first support member includes an arc surface facing away from a side of the flexible display panel and protruding away from the flexible display panel. The first and a second support member can be close to each other so that the side surface of the second support member can be in contact with the arc surface, thus the support assembly is curled in the first direction. The first and second support member can be separated from each other so that the side surface of the second support member can be separated from the arc surface, thus the support assembly stretches in the first direction.

20 Claims, 6 Drawing Sheets

(56) References Cited

U.S. PATENT DOCUMENTS

| | | | |
|---|---|---|---|
| 10,871,797 B1* | 12/2020 | Jo | H04M 1/0237 |
| 10,955,876 B1* | 3/2021 | Song | G06F 1/1652 |
| 10,963,014 B1* | 3/2021 | Park | H04B 1/3827 |
| 11,012,546 B1* | 5/2021 | Song | G06F 1/1656 |
| 11,112,826 B2* | 9/2021 | Ko | G06F 3/04817 |
| 11,140,790 B2* | 10/2021 | Kim | H04B 1/3877 |
| 11,216,106 B2* | 1/2022 | Lindblad | G09F 9/301 |
| 11,270,606 B2* | 3/2022 | Kwon | H05K 5/0017 |
| 11,294,424 B2* | 4/2022 | Shai | G06F 1/1615 |
| 11,334,118 B2* | 5/2022 | Song | G06F 1/1652 |
| 11,343,364 B2* | 5/2022 | Cha | G06F 1/1681 |
| 11,353,926 B2* | 6/2022 | Kim | G06F 1/1652 |
| 11,449,098 B2* | 9/2022 | Jo | H05K 7/183 |
| 11,619,975 B2* | 4/2023 | Cai | G06F 1/1652 |
| | | | 361/679.01 |
| 11,770,945 B2* | 9/2023 | Wang | H10K 77/111 |
| | | | 361/679.01 |
| 2017/0285688 A1 | 10/2017 | Sun | |
| 2019/0098776 A1 | 3/2019 | Jeon | |
| 2022/0078931 A1* | 3/2022 | Tian | G06F 1/1681 |
| 2022/0102672 A1* | 3/2022 | Wang | H10K 77/111 |
| 2022/0221907 A1* | 7/2022 | Cai | G06F 1/1624 |
| 2022/0256020 A1* | 8/2022 | Liu | H01M 50/211 |
| 2022/0276678 A1* | 9/2022 | Luo | H04M 1/0268 |
| 2022/0397937 A1* | 12/2022 | Sun | G06F 1/1652 |
| 2022/0400562 A1* | 12/2022 | Wang | G06F 1/1652 |
| 2023/0141120 A1* | 5/2023 | Chu | H05K 5/0217 |
| | | | 361/807 |
| 2023/0225063 A1* | 7/2023 | Wang | H05K 5/0217 |
| | | | 361/807 |

FOREIGN PATENT DOCUMENTS

| | | |
|---|---|---|
| CN | 110264882 A | 9/2019 |
| CN | 110264882 B | 9/2019 |
| CN | 110360431 A | 10/2019 |
| CN | 110634407 A | 12/2019 |
| CN | 111399593 A | 7/2020 |
| CN | 111583797 A | 8/2020 |
| CN | 111862826 A | 10/2020 |
| CN | 112041808 A | 12/2020 |
| CN | 212322557 U | 1/2021 |
| WO | 2019173950 A1 | 9/2019 |

* cited by examiner

SUPPORT ASSEMBLY AND DISPLAY DEVICE

CROSS-REFERENCE TO RELATED APPLICATION

This application is based upon and claims priority to International Application No. PCT/CN2021/072936, filed on Jan. 20, 2021, where the entire contents thereof are incorporated herein by reference.

TECHNICAL FIELD

The present disclosure relates to the field of display technology and, in particular, to a support assembly and a display device.

BACKGROUND

A flexible display screen can adopt a scroll-type scroll design. In this way, the display screen can be pulled out, which can save the use space of the display screen to the greatest extent, completely change the traditional display screen form from the standard appearance, provide customers with an unprecedented experience, and realize the diversified development of product categories.

SUMMARY

According to one aspect of the present disclosure, a support assembly is provided, where the support assembly is used for supporting a flexible display panel, and the support assembly includes:

A plurality of first support members, the first support member includes an arc surface facing away from a side of the flexible display panel and protruding in a direction away from the flexible display panel.

A plurality of second support members, the plurality of first support members and the plurality of second support members are alternately arranged in sequence in a first direction.

The first support member and the second support member can be close to each other, such that a side surface of the second support member can be in contact with the arc surface of the adjacent first support member, and the support assembly is in a curled state in the first direction; the first support member and the second support member can be separated from each other, such that to enable the side surface of the second support member to be separated from the arc surface of the adjacent first support member, the support assembly is in an stretching state in the first direction.

In an exemplary embodiment of the present disclosure, the first support member includes a plurality of first arc surfaces, a plurality of first planes and two first side faces connected to the first plane, each of the first arc surfaces and the each of the first planes are alternately arranged in a second direction, and the second direction and the first direction intersect.

The second support member comprises a plurality of second arc surfaces, a plurality of second planes and two second side faces connected to the second plane, and each of the second arc surfaces and each of the second planes are alternately arranged in the second direction.

In the first direction, each of the first arc surfaces and each of second planes are arranged in a one-to-one correspondence, and each of the first planes and each of the second arc surfaces are arranged in a one-to-one correspondence; a width of the second plane in the second direction is smaller than the distance between two first planes on both sides of the corresponding first arc surface; a width of the first plane in the second direction is smaller than a distance between two second planes at both sides of the corresponding second arc surface.

In an exemplary embodiment of the present disclosure, the first arc surface and the second arc surface are both a part of a cylindrical surface, and axes of the first arc surface and the second arc surface both extend along the second direction.

In an exemplary embodiment of the present disclosure, a distance from the first plane to the flexible display panel and a distance from the second plane to the flexible display panel are both greater than or equal to a maximum distance from the first arc surface to the flexible display panel, and also greater than or equal to a maximum distance from the second arc surface to the flexible display panel.

In an exemplary embodiment of the present disclosure, the first support member and the second support member both include a first end portion and a second end portion, and the first end portions of the first support member and the second support member are located on the same side, and the second end portions of the first support member and the second support member are located on the same side; the first support member further includes two first side faces connected to the first plane, and the second support member further includes two second side faces connected to the second plane.

The first end portion of the first support member is a first plane, the first plane is a first end plane, the second end portion is a first arc surface, and the first arc surface is a first end arc surface.

The first end portion of the second support member is a second arc surface, and the second arc surface is a second end arc surface, the second end portion of the second surface is a second plane, and the second plane is a second end plane.

The support assembly further includes:

A plurality of first moving members, each of the first moving members is located on a side of the first end plane of the first support member away from the flexible display panel, and side walls of the first moving member match the second side faces of the adjacent second support members.

The first moving member is moved close to a center of the first support member along the second direction under a first force, until at least a part of side walls of the first moving member are in contact with the second side faces of the second support members at two adjacent sides, so as to stretch the flexible display panel; or the first moving member is moved away from the center of the first support member along the second direction under a second force, until the side walls of the first moving member are separated from the second side faces of the second support members at two adjacent sides, so as to curl the flexible display panel.

In an exemplary embodiment of the present disclosure, the first end plane is provided with a slot extending along the second direction, and a surface of the first moving member facing the first end plane is provided with a clamping portion, the clamping portion of the first moving member is located in the slot, and can move along the second direction in the slot on the first end plane.

In an exemplary embodiment of the present disclosure, at least one second side face connected to the second end arc surface of the second support member is provided with a first limiting slot extending along the second direction; at least one side wall of the first moving member is provided with a first sliding member, and when the first moving member moves relative to the first support member, the first sliding member of the first moving member can move in the first limiting slot of the second support member.

In an exemplary embodiment of the present disclosure, the support assembly further includes:

A plurality of second moving members, each of the second moving members is located on a side of the second end plane of the second support member away from the flexible display panel, and side walls of the second moving member match first side faces of the adjacent first support members.

The second moving member is moved close to a center of the second support member along the second direction under a third force, until at least a part of side walls of the second moving member are in contact with first side faces of the first support members at adjacent two sides, so as to stretch the flexible display panel; or the second moving member is moved away from the center of the second support member along the second direction under a fourth force, until side walls of the second moving member are separated from the first side faces of the first support members at adjacent two sides, so as to curl the flexible display panel.

In an exemplary embodiment of the present disclosure, the second end plane is provided with a slot extending along the second direction, and a surface of the second moving member facing the second end plane is provided with a clamping portion, the clamping portion of the second moving member is located in the slot, and is capable of moving along the second direction in the slot on the second end plane.

In an exemplary embodiment of the present disclosure, at least one first side face connected to the first end arc surface of the first support member is provided with a first limiting slot extending along the second direction; at least one side wall of the second moving member is provided with a first sliding member, and when the second moving member moves relative to the second support member, the first sliding member of the second moving member is moved in the first limiting slot of the first support member.

In an exemplary embodiment of the present disclosure, a distance from the first end plane to the flexible display panel is greater than or equal to a maximum distance from the first arc surface connected to the first end plane to the flexible display panel, and is smaller than a distance from the second plane of the second support member to the flexible display panel.

A distance from the second end plane to the flexible display panel is greater than or equal to a maximum distance from the second arc surface connected to the second end plane to the flexible display panel, and is smaller than a distance from the first plane of the first support member to the flexible display panel.

In an exemplary embodiment of the present disclosure, a width of each of the first planes in the first support member in the second direction is equal or not completely equal to each other, a width of each of the first arc surfaces in the first support member in the second direction is equal or not completely equal to each other.

A width of each of the second planes in the second support member in the second direction is equal or not completely equal to each other, a width of each of the second arc surfaces in the second support member in the second direction is equal or not completely equal to each other.

According to another aspect of the present disclosure, a display device is provided, the display device includes:

A flexible display panel.

A support assembly described above, which is used to support the flexible display panel.

The flexible display panel is located on sides of the first support member and the second support member away from the arc surface.

In an exemplary embodiment of the present disclosure, further includes:

A housing, the housing is cylindrical, and a side wall of the housing is provided with an axial opening, and the support assembly and the flexible display panel is capable of extending into or out of the housing from the opening.

In an exemplary embodiment of the present disclosure, both ends of the first support member and the second support member are provided with second sliding members, and two opposite sides of an inner wall of the housing are provided with spiral second limiting slots, the second sliding members of the first support member and the second support member are capable of moving in the second limiting slots of the inner wall of the housing.

In an exemplary embodiment of the present disclosure, when the support assembly comprises the first moving member and the second moving member, the sides of the first moving member away from the first support member and a side of the second moving member away from the second support member are provided with guideposts.

Two guide slots are provided on the inner wall of the housing close to the opening and facing the support assembly, one of the guide slots extends in a third direction, and the other guide slot extends in a fourth direction, and the third direction, the fourth direction, the first direction, and the second direction are all different; The closer to an outside of the opening, the smaller the distance between the two guide slots, and the closer to the inside of the housing, the larger the distance between the two guide slots.

The two guide slots respectively correspond to the first moving member and the second moving member; when the support assembly and the flexible display panel extend into or out from the opening of the housing, the guideposts are moved under the constraint of the corresponding guide slots, so that the first moving member is capable of moving in the second direction relative to the first support member, and the second moving member is capable of moving in the second direction relative to the second support member.

It should be understood that the above general description and the following detailed description are only exemplary and explanatory, and cannot limit the present disclosure.

BRIEF DESCRIPTION OF THE DRAWINGS

The accompanying drawings herein are incorporated into the specification and form a part of the present specification. The embodiments conforming to the present disclosure are shown and used to explain the principles of the present disclosure in conjunction with the specification. Understandably, the accompanying drawings described below are only some embodiments of the present disclosure, and other drawings can be obtained from these accompanying drawings without any creative effort for those skilled in the art.

DETAILED DESCRIPTION

Figure 1:
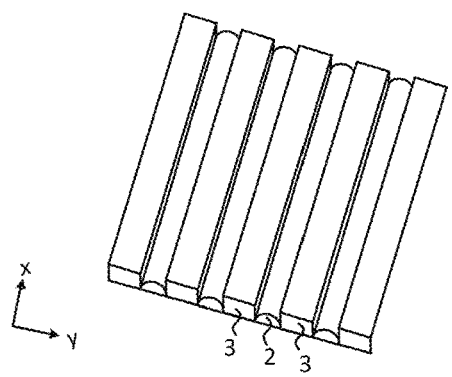
FIG. 1 is a schematic structural diagram of a support assembly of an embodiment of the disclosure.

Now, exemplary embodiments will be described more comprehensive with reference to the accompanying drawings. However, exemplary embodiments can be implemented via various manners, and should not be understood as being limited to the embodiments set forth herein. Conversely, these embodiments are provided so that the present disclosure will be comprehensive and complete, and the concept of the exemplary embodiments will be comprehensively communicated to those skilled in the art. The same reference numeral in the accompanying drawings denote the same or similar structure(s), thereby detailed description thereof will be omitted. Furthermore, the accompanying drawings are only exemplary illustrate of the present disclosure and are not necessarily to scale.

Although relative terms such as "upper" and "lower" are used in this specification to describe the relative relationship between one component of a reference numeral and another component, these terms are used in this specification only for convenience, for example, according to the exemplary direction described in the accompanying drawings. It should be understood that if the device of a reference numeral is flipped upside down, the component described "upper" will become the component "lower". When a component is "on" the other component, it may refer to that the component is formed on the other component, or that the component is "directly" disposed on the other component, or that the component is "indirectly" disposed on the other component via another component.

The terms "one", "a/an", "this", "the", and "at least one" are used to denote the existence of one or more elements/components/etc. The terms "including" and "having" are used to denote the meaning of open inclusion and refer to the existence of additional element/component/etc. In addition to the listed element/component/etc. The terms "first", "second", and "third" are used only as tags, and not as a limitation on the number of objects.

Embodiments of the present disclosure provide a support assembly for supporting a flexible display panel so as to achieve curling and stretching thereof.

Referring to FIG. 1, the x direction in the figure is the second direction, and the y direction is the first direction. The flexible display panel 1 to be supported has a first side extending along the x direction and a second side extending along the y direction.

The support assembly includes a plurality of first support members 2 and a plurality of second support members 3. The plurality of first support members 2 extend along the x direction and are arranged along the y direction, where the first support member 2 includes an arc surface 20 that faces away from the flexible display panel 1 and protrudes away from the flexible display panel 1, and the axis of the arc surface 20 extends along the x direction. The plurality of second support members 3 extend along the x direction and are arranged along the y direction. The plurality of first support members 2 and the plurality of second support members 3 are alternately arranged in sequence in the y direction.

Figure 2:
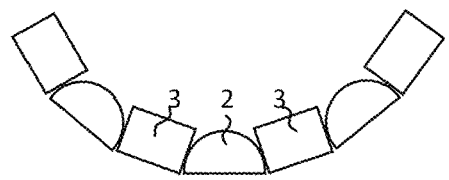
FIG. 2 is a cross-sectional view of the support assembly of FIG. 1 when it is curled.
Figure 3:
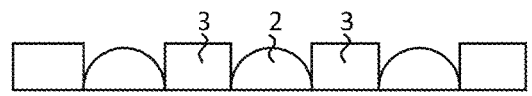
FIG. 3 is a cross-sectional view of the support assembly of FIG. 1 when it is stretched.

Referring to FIG. 2, when the flexible display panel 1 needs to be curled, the second support members 3 at both sides of one first support member 2 gradually move closer to the first support member 2 in the middle. Since the surface of the first support member 2 is an arc surface, the side surface of the second support member 3 can be attached to the arc surface of the adjacent first support member 2, and the entire support assembly is curled along the y direction. The flexible display panel 1 is curled in the y direction. Referring to FIG. 3, when the flexible display panel 1 needs to be stretched, the second support members 3 at both sides are gradually moving away from the first support member 2 in the middle. The side surface of the second support member 3 is separated from the arc surface of the adjacent first support member 2, the entire support assembly is stretched along the y direction, and the flexible display panel 1 can be stretched along the y direction. Therefore, the present disclosure can use the surface morphology of the support members to be curled and stretched, which is simpler than the mechanical connection such as hinged connection in the related art.

In the present disclosure, the side surface of the second support member 3 being able to be attached to the arc surface of the adjacent first support member 2 means that the side surface of the second support member 3 can be in contact with the arc surface of the first support member 2, and can touch only one point or one surface. However, because the second support member 3 needs to be able to rotate relative to the first support member 2, its side wall should not be in a shape that completely contact with the arc surface 20 of the first support member 2. Otherwise, it will not be able to rotate. The side wall of the second support member 3 may be a vertical or inclined plane, or may be an arc surface similar to the arc surface 20, and so on so long as it does not affect the folding of the first support member 2 and the second support member 3 relative to each other.

It should be noted that the side surfaces of the second support member 3 are in contact with or separated from the arc surface of the adjacent first support member 2 described in the present disclosure, which means that the side surfaces of the second support member 3 are attached to or separated from the arc surface of the first support member 2 at both sides of the second support number 3 at the same time. In addition, when the support assembly is in an extended state, the first support member 2 and the second support member 3 can be in contact with each other, and a suitable gap can also be reserved for smooth rotation.

The support assembly of the present disclosure will be described in further detail below.

Figure 4:
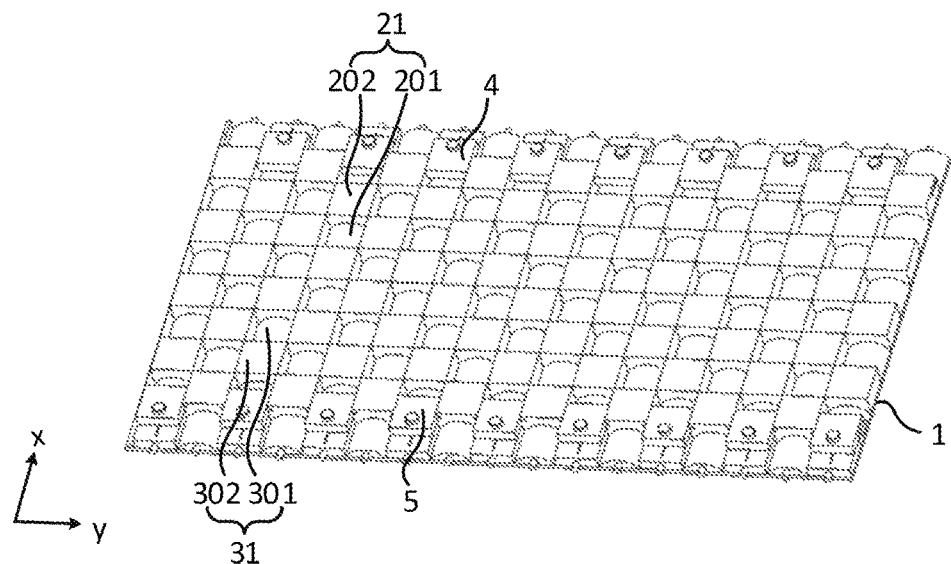
FIG. 4 is a schematic structural diagram of another support assembly of an embodiment of the present disclosure.
Figure 5:
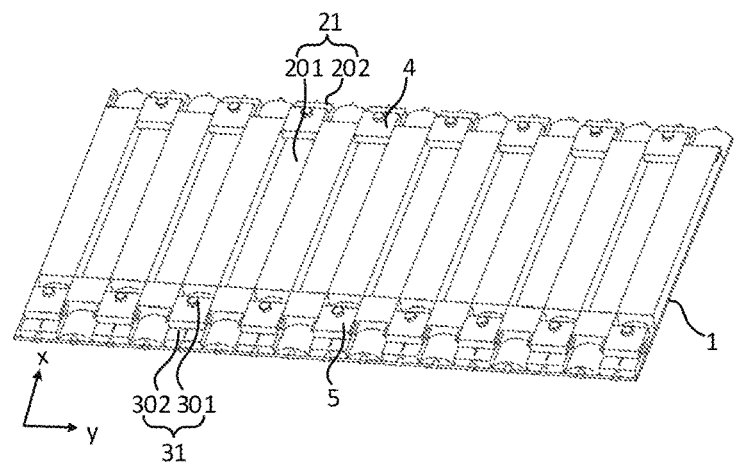
FIG. 5 is a schematic structural diagram of another support assembly of an embodiment of the present disclosure.

In some embodiments, as shown in FIGS. 4 and 5, the first support member 2 includes a first surface 21 facing away from the flexible display panel 1. The first surface 21 of the first support member 2 includes a plurality of first arc surfaces 201 and a plurality of first planes 202, each of the first arc surfaces 201 and each of the first planes 202 are alternately arranged in the x direction. The second support member 3 includes a second surface 31 facing away from the flexible display panel 1. The second surface 31 includes a plurality of second arc surfaces 301 and a plurality of second planes 302, and each of the second arc surfaces 301 and each of the second planes 302 are alternately arranged in the x direction. The second arc surface 301 protrudes away from the flexible display panel 1 and the axis extension direction is the x direction, that is, the second arc surface 301 has a similar shape to the first arc surface 201. In the y direction, each first arc surface 201 and each second plane 302 are arranged in one-to-one correspondence, and each first surface 202 and second arc surface 301 are arranged in one-to-one correspondence. In other words, each arc surface and each plane are staggered in the x-direction and y-direction, and the overall structure is as shown in the figure.

Thus, in the first support member 2 and the second support member 3 that are adjacent in the y direction, the second plane 302 of the second support member 3 can be attached to or separated from the first arc surface 201 of the first support member 2 when the second support member 3 rotates. When the first support member 2 rotates, its first plane 202 can also be attached to or separated from the second arc surface 301 of the second support member 3. Each arc surface and each plane of the entire support assembly can be attached to or separated from each other, so that the structure of the entire support assembly is more precise. At the same time, the design of the first plane 202 and the second plane 302 can make the surface of the entire support assembly flatter, which is more beautiful when stretched out, and it is not easy to affect the structure of the adjacent layer after curling.

Understandably, in order to make the first plane 202 and the second arc surface 301 attach to each other, and the second plane 302 and the first arc surface 201 attach to each other, the width of the second plane 302 in the x direction should be smaller than the distance between the two first planes 202 at both sides of the corresponding first arc surface 201 thereof. The width of the first plane 201 in the x direction should be smaller than the distance between the two second planes 302 on both sides of the corresponding second arc surface 301 thereof. For example, in the x direction, the distance between two adjacent planes 202 can be 1.05 times, 1.1 times, 1.2 times, etc., the width of the corresponding first plane 202. The specific size relationship can be designed according to the support strength of the support assembly and the allowable range of error during curling, which is not specifically limited in the present disclosure.

In this embodiment, referring to FIGS. 4 and 5, the first arc surface 201 and the second arc surface 301 are both a part of a cylindrical surface, and the axes of the first arc surface 201 and the second arc surface 301 extend along the x direction. Since the first support member 2 and the second support member 3 need to be folded in the y direction, the axes of the first arc surface 201 and the second arc surface 301 both extend in the x direction. Of course, in other embodiments, the first arc surface and the second arc surface may also be a part of the surface of a sphere or an oval ball.

In this embodiment, referring to FIGS. 4 and 5, the distance from the first plane 202 to the flexible display panel 1 and the distance from the second plane 302 to the flexible display panel 1 are both greater than or equal to the maximum distance from the first arc surface 201 to the flexible display panel 1, and also greater than or equal to the maximum distance from the second arc surface 301 to the flexible display panel 1. That is, the first plane 202 and the second plane 302 are both the same height as the first arc surface 201 and the second arc surface 301 or higher than the first arc surface 201 and the second arc surface 301. In this way, the first support member 2 and the second support member 3 can achieve the largest possible folding angle when they are curled and folded, and the radius of the flexible display panel 1 after being curled is smaller and the space occupied is smaller.

In the structure shown in FIG. 4, each first arc surface 201 of the first support 2 has the same width in the x direction and the same width in the y direction, and each first plane 202 has the same width in the x direction and the same width in the y direction. Each second arc surface 301 of the second support member 3 has the same size in the x direction and the same size in the y direction, and each second plane 302 has the same with in the x direction and the same with in the y direction. At the same time, the widths of each of the first arc surface 201 and each of the second arc surface 301 are also the same, and the widths of the first plane 202 and the second plane 302 are also the same. From the perspective of the top view, each arc surface and each plane are all rectangles with the same shape and size.

In the structure shown in FIG. 5, each first arc surface 201 in the middle of the first support member 2 has the same width in the y direction, but the width in the x direction is longer than the first arc surface 201 at both ends. That is, from the perspective of the top view, the first arc surface 201 in the middle is strip-shaped, and the first plane 202 and the other first arc surfaces 201 are both rectangular. In the same way, each second plane 302 in the middle of the second support member 3 has the same width in the y direction, but the width in the x direction is longer than the second plane 302 at both ends. That is, from the perspective of a top view, the second plane 302 in the middle is a strip shape, and the second arc surface 301 and the other second planes 302 are both rectangular.

The interior of the first support member 2 may be a solid structure. For example, the first plane 202 may be a surface of a cube, and the first arc surface 201 may be an arc surface of a solid semi-cylinder. The interior of the first support member 2 may also be a hollow structure. For example, there is a hollow structure between the first plane 202 and the side walls at both sides, and the first arc surface 201 is only an arc surface of a hollow semi-cylinder. The sides of the first support member 2 and the second support member 3 facing the flexible support panel only need to be able to give support to the flexible support panel.

Regardless of the structure, the first plane 202 and the first arc surface 201 of the first support member 2 can be formed into an integral structure by machining methods such as stamping and cutting. Both the second plane 302 and the second arc surface 301 of the second support member 3 can be formed into an integral structure by mechanical processing methods such as stamping and cutting.

The following takes the structure shown in FIG. 4 as an example to further describe its detailed structure.

Figure 6:
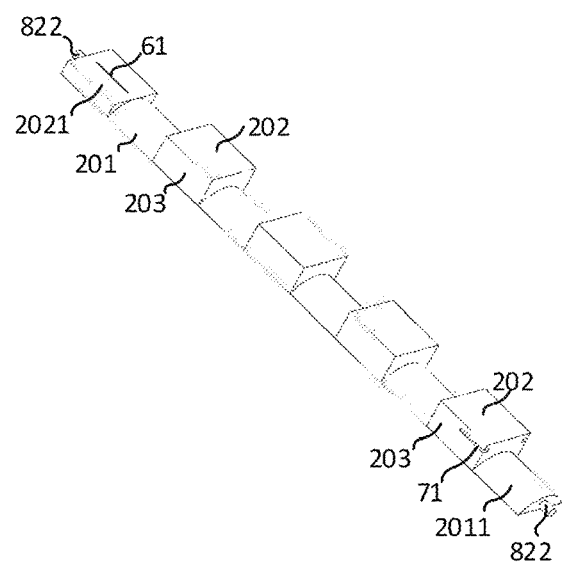
FIG. 6 is a schematic structural diagram of a first support member of an embodiment of the present disclosure.

In an embodiment, referring to FIG. 6, the first support member 2 and the second support member 3 of the present disclosure each includes a first end portion and a second end portion, the first end portions of the first support member 2 and the second support member 3 are located at the same side, and the second end portions of the first support member 2 and the second support member 3 are located at the same side. The shape of the first end portion of the first surface 21 of the first support member 2 is a first plane 202, and the first plane 202 is defined as a first end plane 2021. The shape of the second end portion is a first arc surface 201, and the first arc surface 201 is defined as a first end arc surface 2011. For ease of description, the present disclosure only specifically defines the first end plane 2021 and the first end arc surface 2011 at the end portions. The remaining planes and arc surfaces located between the first end plane 2021 and the first end arc surface 2011 are still referred to as the first plane 202 and the first arc surface 201.

Figure 7:
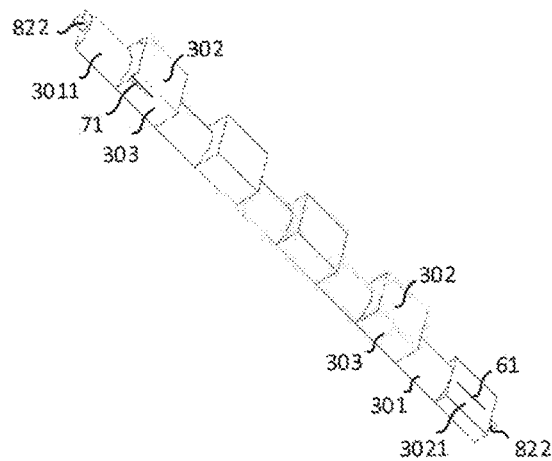
FIG. 7 is a schematic structural diagram of a second support member of an embodiment of the present disclosure.
Figure 8:
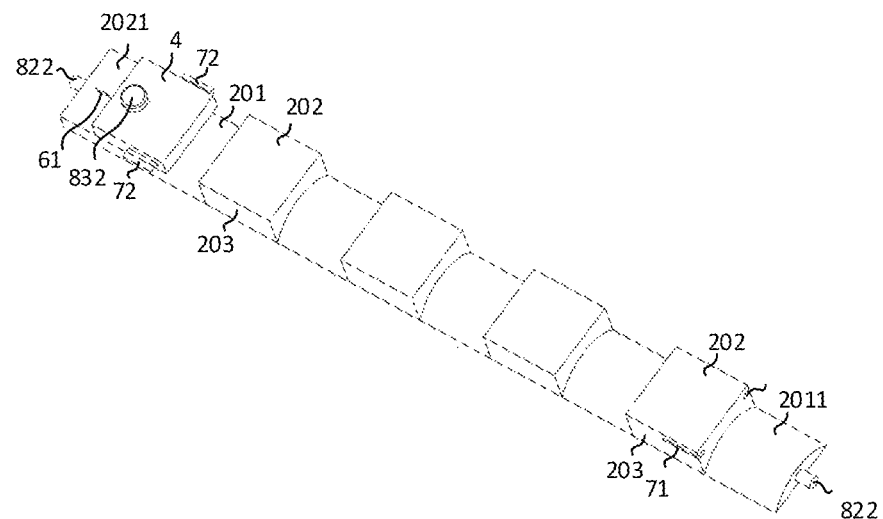
FIG. 8 is a schematic diagram of a combination of a first support member and a first moving member of an embodiment of the present disclosure.

Similarly, referring to FIG. 7, the shape of the first end portion of the second surface 31 is a second arc surface 301, the second arc surface 301 is defined as a second end arc surface 3011, the shape of the second end portion of the second surface 31 is a second plane 302, and the second plane 302 is defined as a second end plane 3021. For the convenience of description, the present disclosure only specifically defines the second end plane 3021 and the second end arc surface 3011 at the end portions. The remaining planes and arc surfaces located between the second end plane 3021 and the second end arc surface 3011 are still referred to as the second plane 302 and the second arc surface 301.

Two first side faces 203 are connected to the first plane 202 of the first support member 2, and two second side faces 303 are connected to the second plane 302 of the support member 3.

Referring to FIGS. 4, 6, and 7, the shapes of the first support member 2 and the second support member 3 are exactly the same, but the placement positions are opposite.

In an embodiment, referring to FIGS. 4 and 8 to 13, the support assembly further includes a plurality of first moving members 4, where each first moving member 4 is located at a side of the first end plane 2021 of the first support member 2 away from the flexible display panel 1, that is, located above the first end plane 2021 in the figure. The first moving member 4 is used to keep the first support member 2 and the second support member 3 in the extended state when they are stretched, so as to avoid unnecessary curling of the flexible display panel 1. The principle is as follows:

The first moving member 4 can move close to the center of the first support member 2 along the x direction under the first force. The side wall of the first moving member 4 matches the second side face 303 of the adjacent second support member 3. Therefore, during the movement of the first moving member 4, the side walls of the first moving member 4 gradually abut the second side faces 303 of the second support members 3 at the adjacent two sides (It should be noted that the second side face 303 is not the second side face adjacent to the second end plane 3021, but the second side face adjacent to the other second plane 302). It is equivalent to that the first moving member 4 located above the first support member 2 is blocked between two adjacent second support members 3, so that the second support member 3 cannot be folded relative to the first support member 2. Thus, the flexible display panel 1 can maintain the stretched state.

On the contrary, the first moving member 4 can move away from the center of the first support member 2 along the x direction under the second force, until the side walls of the first moving member 4 is separated from the second side faces 303 of the second support members 3 at the adjacent two sides. The first moving member 4 is no longer blocked between two adjacent second support members 3, and the second support members 3 can continue to be folded relative to the first support member 2, so that the flexible display panel 1 can be curled.

In the structure of this embodiment, the plurality of first moving members 4 are all located at the first end portions of the first support members 2 and the second support members 3. By blocking the first end portions of the support members, the entire support structure can be fixed.

It is understandable that when the support assembly needs to be stretched, the first moving member 4 only needs to move until its side walls are in contact with the first second side faces 303 of the second support members 3, which can play a blocking role. Of course, it can be further moved to be in contact with the side walls of the next second plane 302 or the second plane 302 being closer to the center.

In another embodiment, referring to FIG. 4, the support assembly further includes a plurality of second moving members 5. Each second moving member 5 is located at a side of the second end plane 3021 of the second support member 3 away from the flexible display panel 1. The second moving member 5 is also used to keep the first support member 2 and the second support member 3 in the stretching state when they are stretched, so as to avoid unnecessary curling of the flexible display panel 1. The side wall of the second moving member 5 matches the first side faces 203 of the adjacent first support members 2, and the principle is the same as that of the first moving member 4. The difference is only opposite to the setting position, so may refer to the schematic diagram of the first moving member. The specific principle is as follows:

The second moving member 5 can move close to the center of the second support member 2 along the x direction under the third force. The side walls of the second moving member 5 match the first side faces 203 of the adjacent first support members 2. Therefore, during the movement of the second moving member 5, the side walls of the second moving member 5 gradually abut the first side faces 203 of the first support members 2 at the adjacent two sides (It should be noted that the first side face is not the first side face 203 adjacent to the first end plane 2021, but the first side face 203 adjacent to the other first plane 202). It is equivalent to that the second moving member 5 located above the second support member 3 is blocked between two adjacent first support members 2, so that the first support member 2 cannot be folded relative to the second support member 3. Thus, the flexible display panel 1 can maintain the stretching state. Alternatively, the second moving member 5 can move away from the center of the second support member 3 along the x direction under the fourth force, until the side walls of the second moving member 5 are separated from the side walls of the first planes 202 of the first support members 2 at the adjacent two sides, to enable the second support member 3 to be folded relative to the first support member 2, the flexible display panel 1 can be curled.

On the contrary, the second moving member 5 can move away from the center of the second support member 3 along the x direction under the fourth force, until the side walls of the second moving member 5 are separated from the first side faces 203 of the first support members 2 at the adjacent two sides. The second moving member 5 is no longer blocked between two adjacent first support members 2, and the first support members 2 can continue to be folded relative to the second support member 3, so that the flexible display panel 1 can be curled.

In the structure of this embodiment, a plurality of second moving members 5 block the second end portions of each first support member 2 and each second support member 3 and cooperate with the plurality of first moving members 4, which can realize the fixing of both ends of each of all support members, so that the structure of the entire support assembly in the stretching state can be more stable, and the flatness of the flexible display panel 1 can be improved.

It is understandable that when the support assembly needs to be stretched, the second moving member 5 only needs to move until its side walls are in contact with the first side faces 202 of the second support members 2, which can play a blocking role. Of course, it can be further moved to be in contact with the side walls of the next first plane 202 or the first plane 202 closer to the center.

As shown in FIGS. 4 and 5, since the structures of the first support member 2 and the second support member 3 in this embodiment are exactly the same, but the placement positions are opposite, the first moving member 4 and the second moving member 5 are arranged crosswise. At the same time, in this embodiment, the dimensions of the first moving member 4 in the x direction and the y direction are the same as those of the first support member 2, and the dimensions of the second moving member 5 in the x direction and the y direction are the same as those of the second support member 3.

In another embodiment, the shape of the two end portions of the first support member 2 may both be the first plane 202, and the shape of the two end portions of the second support member 3 may both be the second arc surface 301. Thus, the first moving member 4 and the second moving member 5 can be respectively arranged on the first planes 202 at the two ends of the first support member 2. When the first moving member 4 and the second moving member 5 move inward at the same time, they can be blocked on the second planes 302 of the second support members 3 at both sides, which can also play a role in blocking the folding of the second support member 3 relative to the first support member 2. The specific principle is the same as the foregoing embodiment, and will not be repeated here.

In an embodiment, referring to FIG. 6, the distance from the first end plane 2021 of the first support member 2 to the flexible display panel 1 is greater than or equal to the maximum distance from the first arc surface 201 connected to it to the flexible display panel 1. That is to say, the lower surface of the first moving member 4 arranged above the first end plane 2021 is not lower than the first arc surface 201 connected to the first end plane 2021. Therefore, the first moving member 4 can move smoothly to the inside without being blocked by the first arc surface 201. At the same time, the distance from the first end plane 2021 to the flexible display panel 1 needs to be smaller than the distance from the second plane 302 of the second support member 3 to the flexible display panel 1. That is to say, the lower surface of the first moving member 4 is lower than the adjacent second plane 302. Therefore, when the first moving member 4 moves inward, its side walls can block the second planes 302, otherwise the first moving member 4 will not be able to contact the second planes 302.

Similarly, the distance from the second end plane 3021 to the flexible display panel 1 is greater than or equal to the maximum distance from the second arc surface 301 connected to it to the flexible display panel 1, and smaller than the distance from the first plane 202 of the first support member 2 to the flexible display panel 1.

Figure 9:
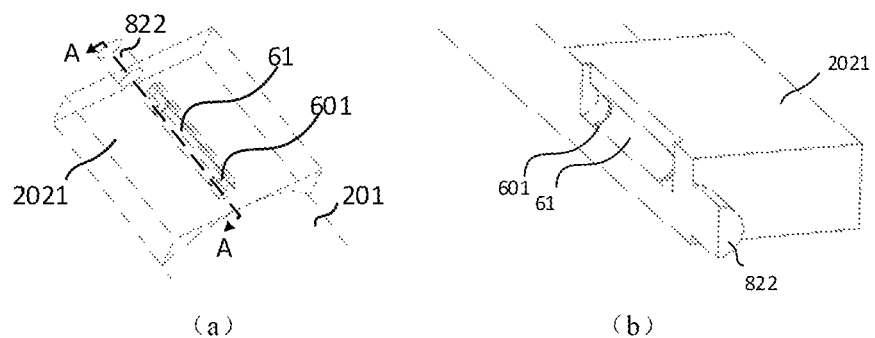
FIG. 9 is a schematic structural diagram of a first end plane of a first support member of an embodiment of the present disclosure.
Figure 10:
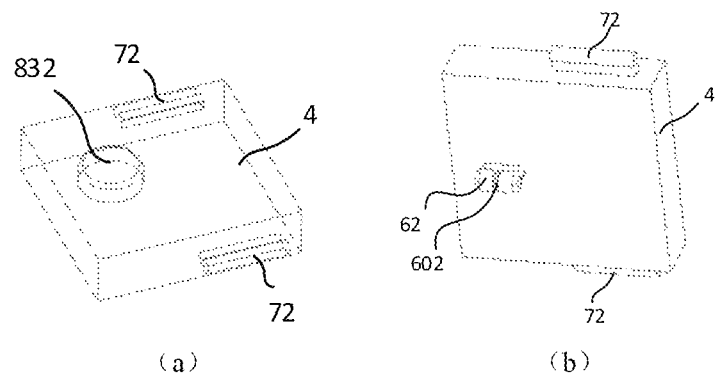
FIG. 10 is a schematic structural diagram of a first moving member of an embodiment of the present disclosure.
Figure 11:
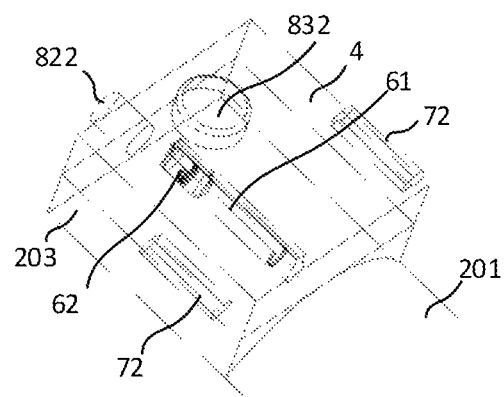
FIG. 11 is a schematic diagram of a state of the combination of the first end plane and the first moving member of an embodiment of the present disclosure.
Figure 12:
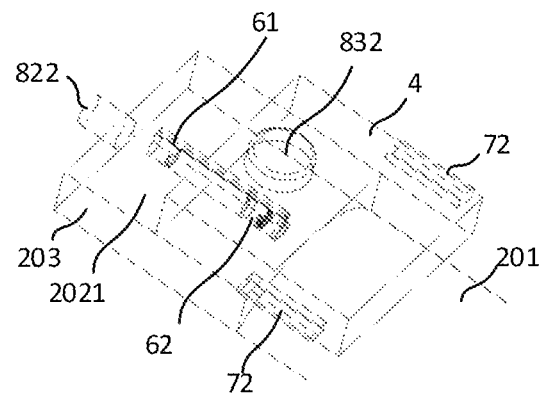
FIG. 12 is a schematic diagram of another state of the combination of the first end plane and the first moving member of an embodiment of the present disclosure.
Figure 13:
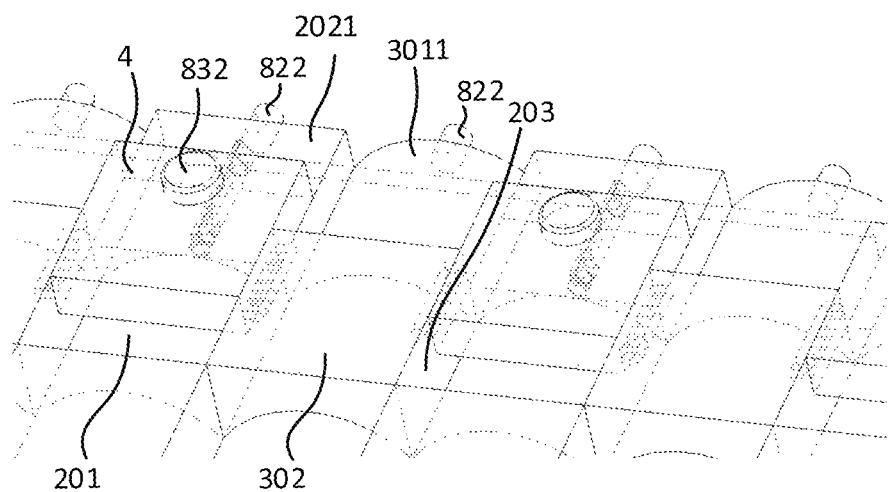
FIG. 13 is a schematic diagram of a combination of a plurality of first support members and a plurality of first moving members of an embodiment of the present disclosure.

In an embodiment, refer to FIGS. 9 to 13, where FIG. 9 is a schematic structural diagram of the first support member 2, FIG. 9(a) is a schematic structural diagram showing the side of the first support member 2 facing away from the flexible display panel, and FIG. 9(b) is a schematic cross-sectional view along the A-A direction in FIG. 9(a). FIG. 10 is a schematic structural diagram of the first moving member 4, and FIG. 10(a) is a schematic structural diagram showing the side of the first moving member 4 facing away from the first support member 2, FIG. 10(b) is a schematic structural diagram showing the side of the first moving member 4 facing the first support member 2. The first end plane 2021 of the first support member 2 is provided with a slot 61 extending along the x direction, the surface of the first moving member 4 facing the first end plane 2021 (that is, the lower surface in the figure) is provided with a clamping portion 62, the clamping portion 62 of the first moving member 4 is located in the slot 61 on the first end plane 2021 and can move along the x direction in the slot 61. On one hand, the cooperation of the clamping portion 62 and the slot 61 can connect the first moving member 4 and the first support member 2 together. On the other hand, the movement of the first moving member 4 can be restricted so that it can smoothly enter between two adjacent second support members 3.

Similarly, the second end plane 3021 of the second support member 3 is provided with a slot 61 extending in the x direction, and the second moving member 5 is provided with a clamping portion 62 on the surface facing the second end plane 3021, the clamping portion 62 of the second moving member 5 is located in the slot 61 on the second end plane 3021 and can move along the x direction in the slot 61. On the one hand, the cooperation of the clamping portion 62 and the slot 61 can connect the second moving member 5 and the second support member 3 together, on the other hand, the movement of the second moving member 5 can be restricted so that it can smoothly enter between two adjacent first support members 2.

Specifically, referring to FIGS. 9(b) and 10(b), the clamping portion 62 of the first moving member 4 or the second moving member 5 is a flexible member that can be elastically deformed, such that when the clamping portion 62 slides in the slot 61, it can achieve a close fit with the slot 61. In addition, a limiting member 601 is provided in the slot 61 of the first support member 2 or the second support member 3. In this embodiment, the limiting member 601 is a convex ring provided on the surface of the slot 61. The surface of the clamping portion 62 is also provided with a corresponding groove 602. When the clamping portion 62 slides in the slot 61, when the groove 602 provided on the surface of the clamping portion 62 moves to the convex ring of the limiting member 601, the convex ring is caught in the groove, and the position of the clamping portion 62 is restricted. The limiting member 601 of this embodiment includes two convex rings, one is used to fix the clamping portion 62 at a position close to the center of the support member, and the other is used to fix the clamping portion 62 at a position close to the end of the support member. It is ensured that the clamping portion 62 will not fall out of the slot 61, thereby ensuring that the first moving member or the second moving member can be stabilized at two fixed positions, ensuring the blocking effect or releasing the blocking. When the first moving member 4 or the second moving member 5 needs to be moved, it is only necessary to overcome the rebound force of the clamping portion 62. In a specific implementation, the position of the convex ring can be arranged, so that when the first moving member 4 moves inward in the x direction, it moves exactly half the size in the x direction and blocks half of the second support member 3, thereby achieving a relatively stable blocking effect. The limiting structure is only an example. In other specific embodiments, other limiting manners can also be used to limit the position of the clamping portion in the slot.

In one embodiment, referring to FIGS. 7 to 13, the second side face 303 of the second end portion of the second support member 3 is provided with a first limiting slot 71 extending along the x direction. Two corresponding side walls of the first moving member 4 are provided with first sliding members 72, and the first sliding member 72 can move in the first limiting slot 71.

When the first moving member 4 moves inward, the first sliding member 72 of the first moving member 4 will enter the first limiting slot 71 and then move along the first limiting slot 71. When the first moving member 4 moves to the outside, the first sliding member 72 of the first moving member 4 will leave the first limiting slot 71, which will no longer cause obstruction. Therefore, the first limiting slot 71 must extend to the side of the second side face 303 facing the second end arc surface 3011 so that the first sliding member 72 can enter and exit the first limiting slot 71.

On the one hand, the cooperation of the first sliding member 72 and the first limiting slot 71 enables the first moving member 4 to connect the second support members 3 at both sides together. On the other hand, it can be ensured that the first moving member 4 will not be displaced in the direction perpendicular to the flexible display panel 1, and the structure of the entire support assembly is more stable.

In other embodiments, only one pair of the first limiting slot 71 and the first sliding member 72 may also be provided. That is, the first limiting slot 71 is provided only on any one of the side walls of the second plane 302, and the first sliding member 72 is provided on a corresponding side wall of the first moving member 4.

Similarly, in this embodiment, the first side face 203 of the first end portion of the first support member 2 is provided with a first limiting slot 71 extending along the x direction; The second moving member 5 is provided with a first sliding member 72 on its side wall corresponding to the first limiting slot 71. The structures of the first sliding member 72 of the second moving member 5 and the first limiting slot 71 on the first support member 2 are the same as those of the first moving member 4 and the second support member 3, and will not be repeated here.

The present disclosure also provides a display device, including a flexible display panel 1 and the support assembly described in any of the above embodiments. The flexible display panel 1 is located on the sides of the first support member 2 and the second support member 3 away from the arc surface. That is, the sides of the first support member 2 and the second support member 3 away from the first surface 21 and the second surface 31. They can be fixed by bonding, riveting, welding and other methods.

The present disclosure does not specifically limit the applicability of the display device, which can be any product or component with flexible display function, such as a TV set, a notebook computer, tablet computers, wearable display devices, mobile phones, car displays, navigation, e-books, digital photo frames, advertising light boxes and so on.

Figure 14:
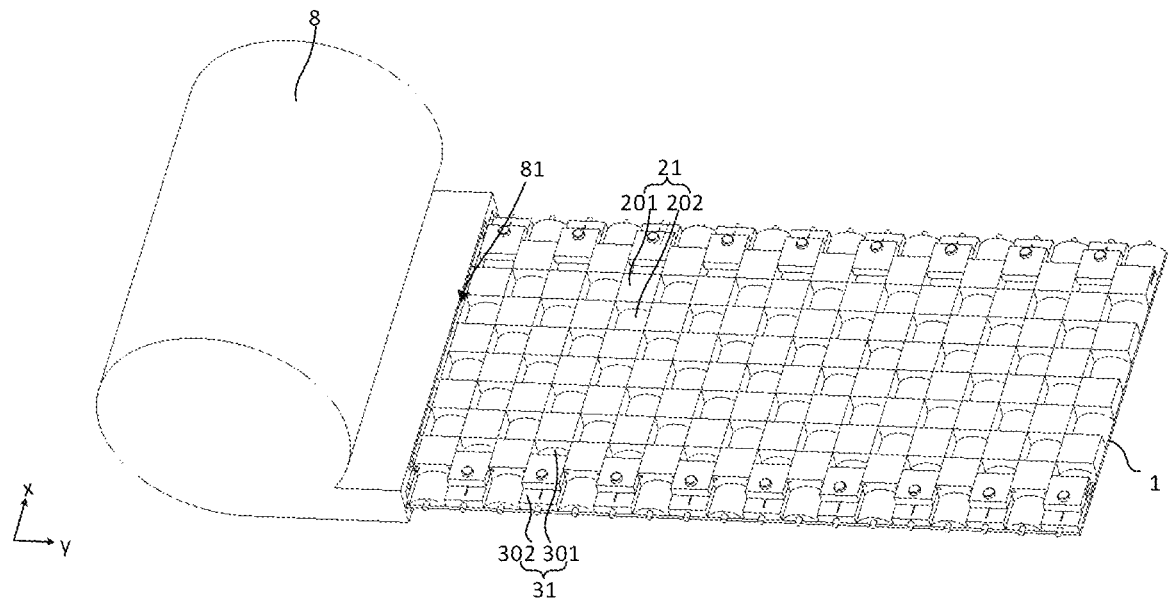
FIG. 14 is a schematic diagram of a structure of a display device of an embodiment of the present disclosure.
Figure 15:
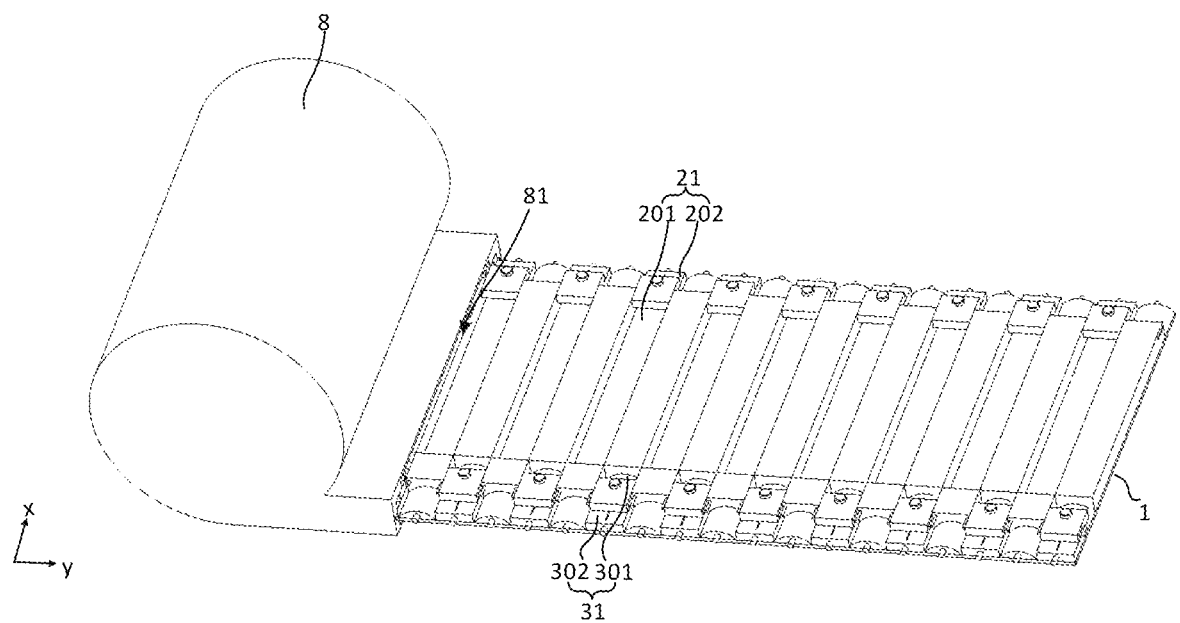
FIG. 15 is a schematic diagram of another structure of a display device of an embodiment of the present disclosure.

In an embodiment, in order to store the curled flexible display panel 1, the display device further includes a cylindrical housing 8. Referring to FIGS. 14 and 15, the side wall of the housing 8 has an opening 81 along the axial direction, that is, an opening 81 faces the y direction in the figure, and the support assembly and the flexible display panel 1 can extend into or out from the opening 81.

Figure 16:
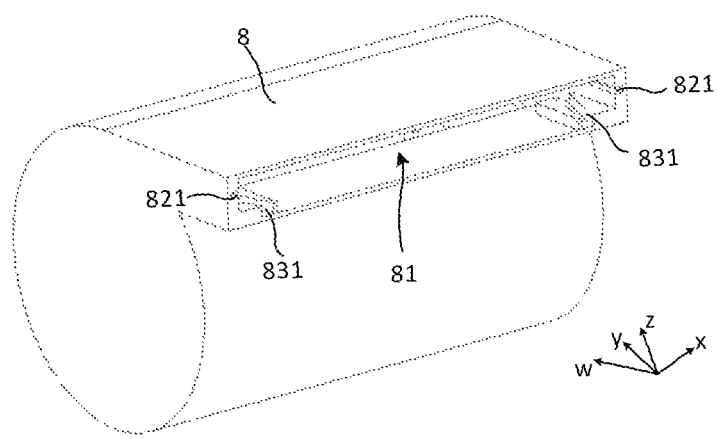
FIG. 16 is a schematic structural diagram of a housing of a display device of an embodiment of the present disclosure.
Figure 17:
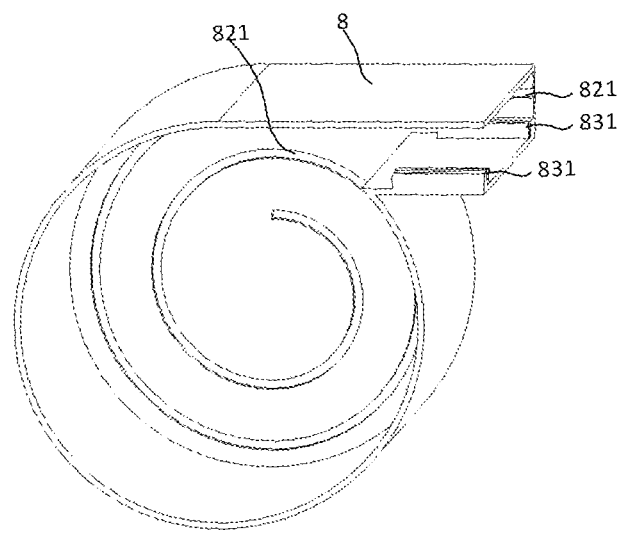
FIG. 17 is a cross-sectional view of the housing of the display device of the embodiment of the present disclosure.

In an embodiment, referring to FIGS. 8-13, both ends of the first support member 2 and the second support member 3 are provided with second sliding members 822. That is, a second sliding member 822 is provided on the outer side surface connected to the first end arc surface 2011 and the first end plane 2021, a second sliding member 822 is also provided on the outer side surface connected to the second end arc surface 3011 and the second end plane 3021. Referring to FIGS. 16 and 17, two opposite sides of the inner wall of the housing 8 are provided with spiral second limiting slots 821. The second sliding members 822 of the first support member 2 and the second support member 3 can move in the second limiting slots 821 of the inner wall of the housing 8. Specifically, when the support assembly and the flexible display panel 1 are rolled into the housing 8 together, the second sliding members 822 at both ends of the support assembly move along the second limiting slots 821 in sequence, so that the flexible display panel 1 is gradually curled into multiple layers. When the flexible display panel 1 is stretched outward, it is opposite to when it is curled. It should be noted that sufficient spacing should be reserved between the layers to ensure that they do not affect each other.

In an embodiment, referring to FIGS. 8-13, when the support assembly includes the first moving member 4 and the second moving member 5, the side of the first moving member 4 away from the first support member 2 and the side of the second moving member 5 away from the second support member 3 are both provided with a guidepost 832. That is, the upper surface in the figure.

Referring to FIGS. 16 and 17, two guide slots 831 are provided on the inner wall of the housing 8 near the opening 81 and facing the support assembly, and the guide slots 831 extend along the z direction in the figure. One guide slot 831 extends along the z direction, and the other guide slot 831 extends along the w direction, and the z direction, the w direction, the x direction, and the y direction are all different. The two guide slots 831 form a structure of which the spacing at one end is relatively large, and the spacing at the other end is relatively small as shown in the figure. The closer the distance between the two guide slots 831 to the outside of the opening 81 is, the smaller the distance between the two guide grooves 831 is, and the closer the distance between the two guide grooves 831 to the inside the housing 8 is, the larger the distance between the two guide grooves 831 is.

The two guide slots 831 correspond to the first moving member 4 and the second moving member 5 respectively. When the support assembly and the flexible display panel 1 extend into or out from the opening 81 of the housing 8, the guidepost 832 on the moving member can move under the restriction of the corresponding guide slot 831. Specifically, when the support assembly and the flexible display panel 1 extend out from the opening 81 of the housing 8, the guidepost 832 on the first moving member 4 can move to the center of the first support member 2 under the constraint of its corresponding guide slot 831, the guidepost 832 on the second moving member 5 can move to the center of the second support member 3 under the constraint of its corresponding guide slot 831. That is, the first moving member 4 and the second moving member 5 move to the middle at the same time, so as to realize the blocking and keep the flexible display panel 1 stretched. When the support assembly and the flexible display panel 1 extend inward from the opening 81 of the housing 8, the guidepost 832 on the first moving member 4 can move to the end of the first support member 2 under the constraint of its corresponding guide slot 831, the guidepost 832 on the second moving member 5 can move to the end of the second support member 3 under the constraint of its corresponding guide slot 831. That is, the first moving member 4 and the second moving member 5 move to the side at the same time, so as to release the blocking, so that the flexible display panel 1 can be curled.

In other words, a guide slot 831 can provide the first force and the second force for the first moving member 4, the other guide slot 831 can provide the second moving member 5 with a third force and a fourth force. In the present disclosure, the moving members can be pushed to move through the guide slots 831 provided on the inner wall of the housing 8 without using other driving mechanisms, which greatly simplifies the structure of the entire display device.

After considering the specification and practicing the disclosure herein, it will be easy for those skilled in the art to think of the other implementations of the disclosure. The application intends to cover any variants, usage or changes of adaptation of the present disclosure. These variants, usage or changes of adaptation follow the general principles of the present disclosure, and include common sense or common technical means in the technical field not disclosed by the disclosure. The specification and embodiments are only exemplary, and the true scope and spirit of the present disclosure are defined by the appended claims.

What is claimed is:

1. A support assembly for supporting a flexible display panel, wherein the support assembly comprises:
   a plurality of first support members, wherein a first support member of the plurality of first support members comprises an arc surface facing away from a side of the flexible display panel and protruding in a direction away from the flexible display panel;
   a plurality of second support members, the plurality of first support members and the plurality of second support members are alternately arranged in sequence in a first direction, wherein:
   the first support member and a second support member of the plurality of second support members are capable of being close to each other so that a side surface of the second support member is able to be in contact with the arc surface of an adjacent first support member, and the support assembly is in a curled state in the first direction; and
   the first support member and the second support member are capable of being separated from each other, so that the side surface of the second support member is able to be separated from the arc surface of the adjacent first support member, the support assembly is in a stretching state in the first direction.

2. The support assembly according to claim 1, wherein:
   the first support member comprises a plurality of first arc surfaces and a plurality of first planes facing away from the flexible display panel, each of the first arc surfaces and each of the first planes are alternately arranged in a second direction, and the second direction and the first direction intersect;
   the second support member comprises a plurality of second arc surfaces and a plurality of second planes facing away from the flexible display panel, and each of the second arc surfaces and each of the second planes are alternately arranged in the second direction;
   in the first direction, each of the first arc surfaces and each of second planes are arranged in a one-to-one correspondence, and each of the first planes and each of the second arc surfaces are arranged in a one-to-one correspondence;
   a width of a second plane in the second direction is smaller than a distance between two first planes at both sides of a corresponding first arc surface; and
   a width of a first plane in the second direction is smaller than a distance between two second planes at both sides of a corresponding second arc surface.

3. The support assembly according to claim 2, wherein a first arc surface and a second arc surface are both a part of a cylindrical surface, and axes of the first arc surface and the second arc surface both extend along the second direction.

4. The support assembly according to claim 3, wherein a distance from the first plane to the flexible display panel and a distance from the second plane to the flexible display panel are both greater than or equal to a maximum distance from the first arc surface to the flexible display panel, and also greater than or equal to a maximum distance from the second arc surface to the flexible display panel.

5. The support assembly according to claim 3, wherein:
   the first support member and the second support member both comprise a first end portion and a second end portion, and first end portions of the first support member and the second support member are located at the same side, and second end portions of the first support member and the second support member are located at the same side; the first support member further comprises two first side faces connected to the first plane, and the second support member further comprises two second side faces connected to the second plane;
   the first end portion of the first support member is a first plane, the first plane is a first end plane, the second end portion is a first arc surface, and the first arc surface is a first end arc surface;
   the first end portion of the second support member is a second arc surface, and the second arc surface is a second end arc surface, the second end portion of the second surface is a second plane, and the second plane is a second end plane; and
   the support assembly further comprises:
      a plurality of first moving members, wherein each of the first moving members is located on a side of the first end plane of the first support member away from the flexible display panel, and side walls of the first moving member match the second side faces of the adjacent second support members; and
      the first moving member is moved close to a center of the first support member along the second direction under a first force, until at least a part of side walls of the first moving member are in contact with the second side faces of the second support members at two adjacent sides, so as to stretch the flexible display panel; or the first moving member is moved away from the center of the first support member along the second direction under a second force, until the side walls of the first moving member are separated from the second side faces of the second support members at two adjacent sides, so as to curl the flexible display panel.

6. The support assembly according to claim 5, wherein the first end plane is provided with a slot extending along the second direction, and a surface of the first moving member facing the first end plane is provided with a clamping portion, the clamping portion of the first moving member is located in the slot, and is capable of moving along the second direction in the slot on the first end plane.

7. The support assembly according to claim 6, wherein at least one second side face connected to the second end arc surface of the second support member is provided with a first limiting slot extending along the second direction; at least one side wall of the first moving member is provided with a first sliding member, and when the first moving member moves relative to the first support member, the first sliding member of the first moving member is capable of moving in the first limiting slot of the second support member.

8. The support assembly according to claim 5, wherein the support assembly further comprises:
a plurality of second moving members, each of the second moving members is located on a side of the second end plane of the second support member away from the flexible display panel, and side walls of the second moving member match first side faces of the adjacent first support members; and
the second moving member is moved close to a center of the second support member along the second direction under a third force, until at least a part of side walls of the second moving member are in contact with first side faces of the first support members at adjacent two sides, so as to stretch the flexible display panel; or the second moving member is moved away from the center of the second support member along the second direction under a fourth force, until side walls of the second moving member are separated from the first side faces of the first support members at adjacent two sides, so as to curl the flexible display panel.

9. The support assembly according to claim 8, wherein the second end plane is provided with a slot extending along the second direction, and a surface of the second moving member facing the second end plane is provided with a clamping portion, the clamping portion of the second moving member is located in the slot, and is capable of moving along the second direction in the slot on the second end plane.

10. The support assembly according to claim 9, wherein:
at least one first side face connected to the first end arc surface of the first support member is provided with a first limiting slot extending along the second direction;
at least one side wall of the second moving member is provided with a first sliding member, and
when the second moving member moves relative to the second support member,
the first sliding member of the second moving member is moved in the first limiting slot of the first support member.

11. The support assembly of claim 5, wherein:
a distance from the first end plane to the flexible display panel is greater than or equal to a maximum distance from the first arc surface connected to the first end plane to the flexible display panel, and is smaller than a distance from the second plane of the second support member to the flexible display panel; and
a distance from the second end plane to the flexible display panel is greater than or equal to a maximum distance from the second arc surface connected to the second end plane to the flexible display panel, and is smaller than a distance from the first plane of the first support member to the flexible display panel.

12. The support assembly of claim 2, wherein:
a width of each of the first planes in the first support member in the second direction is equal or not completely equal to each other, a width of each of the first arc surfaces in the first support member in the second direction is equal or not completely equal to each other; and
a width of each of the second planes in the second support member in the second direction is equal or not completely equal to each other, a width of each of the second arc surfaces in the second support member in the second direction is equal or not completely equal to each other.

13. A display device, comprising:
a flexible display panel;
a support assembly configured to support the flexible display panel, the support assembly comprising:
a plurality of first support members, wherein a first support member of the plurality of first support members comprises an arc surface facing away from the flexible display panel and protruding in a direction away from the flexible display panel; and
a plurality of second support members, the plurality of first support members and the plurality of second support members are alternately arranged in sequence in a first direction, wherein:
the first support member and a second support member of the plurality of second support members are capable of being close to each other so that a side surface of the second support member is able to be in contact with the arc surface of an adjacent first support member, and the support assembly is in a curled state in the first direction;
the first support member and the second support member are capable of being separated from each other, so that the side surface of the second support member is able to be separated from the arc surface of the adjacent first support member, the support assembly is in an stretching state in the first direction; and
the flexible display panel is located on sides of the first support member and the second support member away from the arc surface.

14. The display device according to claim 13, further comprises:
a housing, wherein the housing is cylindrical, and a side wall of the housing is provided with an axial opening, and the support assembly and the flexible display panel is capable of extending into or out from the housing from the opening.

15. The display device according to claim 14, wherein both ends of the first support member and the second support member are provided with second sliding members, and two opposite sides of an inner wall of the housing are provided with spiral second limiting slots, the second sliding members of the first support member and the second support member are capable of moving in the second limiting slots of the inner wall of the housing.

16. The display device according to claim 15, wherein:
when the support assembly comprises a first moving member and a second moving member, a side of the first moving member away from the first support member and a side of the second moving member away from the second support member are provided with guideposts;

two guide slots are provided on the inner wall of the housing close to the opening and facing the support assembly, one of the guide slots extends in a third direction, and the other guide slot extends in a fourth direction, and the third direction, the fourth direction, the first direction, and the second direction are all different; the closer to an outside of the opening, the smaller the distance between the two guide slots, and the closer to an inside of the housing, the larger the distance between the two guide slots;

the two guide slots respectively correspond to the first moving member and the second moving member; and when the support assembly and the flexible display panel extend into or out from the opening of the housing, the guideposts are moved under the constraint of the corresponding guide slots, so that the first moving member is capable of moving in the second direction relative to the first support member, and the second moving member is capable of moving in the second direction relative to the second support member.

17. The display device according to claim 13, wherein:

the first support member comprises a plurality of first arc surfaces and a plurality of first planes facing away from the flexible display panel, each of the first arc surfaces and each of the first planes are alternately arranged in a second direction, and the second direction and the first direction intersect;

the second support member comprises a plurality of second arc surfaces and a plurality of second planes facing away from the flexible display panel, and each of the second arc surfaces and each of the second planes are alternately arranged in the second direction;

in the first direction, each of the first arc surfaces and each of second planes are arranged in a one-to-one correspondence, and each of the first planes and each of the second arc surfaces are arranged in a one-to-one correspondence;

a width of a second plane in the second direction is smaller than a distance between two first planes at both sides of a corresponding first arc surface; and a width of a first plane in the second direction is smaller than a distance between two second planes at both sides of a corresponding second arc surface.

18. The display device according to claim 17, wherein a first arc surface and a second arc surface are both a part of a cylindrical surface, and axes of the first arc surface and the second arc surface both extend along the second direction.

19. The display device according to claim 18, wherein a distance from the first plane to the flexible display panel and a distance from the second plane to the flexible display panel are both greater than or equal to a maximum distance from the first arc surface to the flexible display panel, and also greater than or equal to a maximum distance from the second arc surface to the flexible display panel.

20. The display device according to claim 18, wherein:

the first support member and the second support member both comprise a first end portion and a second end portion, and first end portions of the first support member and the second support member are located at the same side, and second end portions of the first support member and the second support member are located at the same side;

the first support member further comprises two first side faces connected to the first plane, and the second support member further comprises two second side faces connected to the second plane;

the first end portion of the first support member is a first plane, the first plane is a first end plane, the second end portion is a first arc surface, and the first arc surface is a first end arc surface;

the first end portion of the second support member is a second arc surface, and the second arc surface is a second end arc surface, the second end portion of the second surface is a second plane, and the second plane is a second end plane; and the support assembly further comprises:

a plurality of first moving members, each of the first moving members is located on a side of the first end plane of the first support member away from the flexible display panel, and side walls of the first moving member match the second side faces of the adjacent second support members; and the first moving member is moved close to a center of the first support member along the second direction under a first force, until at least a part of side walls of the first moving member are in contact with the second side faces of the second support members at two adjacent sides, so as to stretch the flexible display panel; or the first moving member is moved away from the center of the first support member along the second direction under a second force, until the side walls of the first moving member are separated from the second side faces of the second support members at two adjacent sides, so as to curl the flexible display panel.

* * * * *